US012603791B2

(12) United States Patent
John et al.

(10) Patent No.: US 12,603,791 B2
(45) Date of Patent: Apr. 14, 2026

(54) SYSTEMS AND METHODS FOR PROVIDING PRIORITY FOR USER EQUIPMENT

(71) Applicant: Verizon Patent and Licensing Inc., Basking Ridge, NJ (US)

(72) Inventors: Toby Varughese John, Murphy, TX (US); Bibi M. Hakimzadeh, Fort Worth, TX (US); Lixia Yan, Basking Ridge, NJ (US); Chien-Yuan Huang, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 52 days.

(21) Appl. No.: 18/886,003

(22) Filed: Sep. 16, 2024

(65) Prior Publication Data

US 2026/0081792 A1     Mar. 19, 2026

(51) Int. Cl.
| | |
|---|---|
| *H04L 9/32* | (2006.01) |
| *H04W 12/0471* | (2021.01) |

(52) U.S. Cl.
CPC ....... *H04L 9/3268* (2013.01); *H04W 12/0471* (2021.01)

(58) Field of Classification Search
CPC ..... H04L 9/32; H04L 9/3268; H04W 12/0471
See application file for complete search history.

(56) References Cited

U.S. PATENT DOCUMENTS

| | | | |
|---|---|---|---|
| 2007/0133528 A1* | 6/2007 | Jin ..................... | H04L 63/0428 370/428 |
| 2017/0374016 A1* | 12/2017 | Reddy ................ | H04L 61/4511 |

FOREIGN PATENT DOCUMENTS

| | | | |
|---|---|---|---|
| EP | 3731481 A1 * | 10/2020 | ............. H04L 45/30 |

OTHER PUBLICATIONS

Huang et al., "Prioritized Traffic Shaping for Low-latency MEC Flows in MEC-enabled Cellular Networks," 2022 IEEE 19th Annual Consumer Communications & Networking Conference (CCNC), Las Vegas, NV, USA, 2022, pp. 120-125, doi: 10.1109/CCNC49033. 2022.9700715 (Year: 2022).*

Yassin et al., Demo Abstract: 5G End-to-End Open Source Network with Traffic Prioritization Mechanism, IEEE INFOCOM 2019— IEEE Conference on Computer Communications Workshops (Infocom Wkshps), Paris, France, 2019, pp. 973-974, doi: 10.110/INFCOMW. 2019.8845291 (Year: 2019).*

* cited by examiner

*Primary Examiner* — Jayesh M Jhaveri

(57) ABSTRACT

A network device may receive a first private certificate and a second private certificate, and may provision the network device with the first private certificate and the second private certificate. The network device may receive, from a first UE, an IKE SA INIT request with a first payload that includes a priority indicator, and may decrypt the encrypted first IKE SA INIT request with the first private certificate. The network device may receive, from a second UE, an encrypted second IKE SA INIT request with a second payload that does not include the priority indicator, and may decrypt the encrypted second IKE SA INIT request with the second private certificate. The network device may detect congestion, and may prioritize traffic from the first UE over traffic from the second UE based on the congestion and based on the priority indicator.

20 Claims, 10 Drawing Sheets

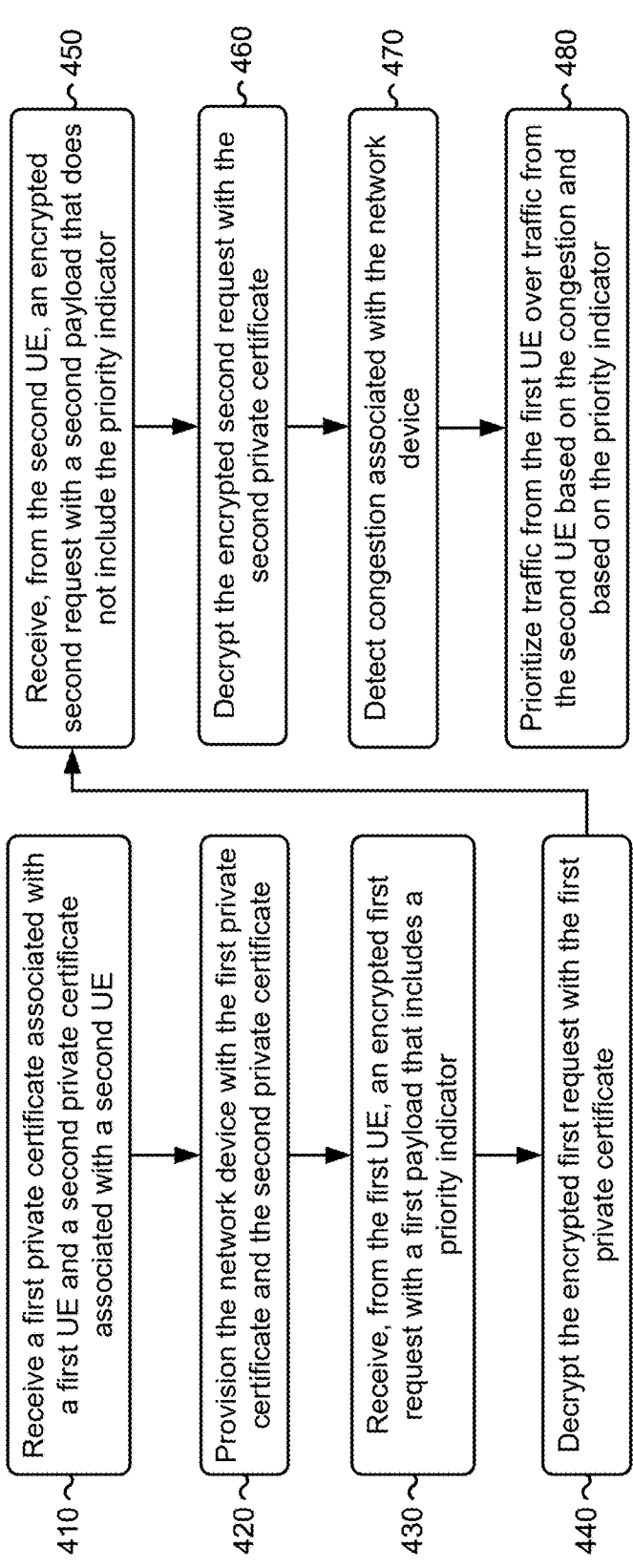

400

410  Receive a first private certificate associated with a first UE and a second private certificate associated with a second UE 420  Provision the network device with the first certificate and the second private certificate 430  Receive, from the first UE, an encrypted first request with a first payload that includes a priority indicator 440  Decrypt the encrypted first request with the first private certificate 450  Receive, from the second UE, an encrypted second request with a second payload that does not include the priority indicator 460  Decrypt the encrypted second request with the second private certificate 470  Detect congestion associated with the network device 480  Prioritize traffic from the first UE over traffic from the second UE based on the congestion and based on the priority indicator

FIG. 4

SYSTEMS AND METHODS FOR PROVIDING PRIORITY FOR USER EQUIPMENT

BACKGROUND

The progressively increasing demands on non-Third-Generation-Partnership-Project (non-3GPP) access networks (e.g., untrusted access networks), such as Wi-Fi, pose significant challenges for managing network resources efficiently. In particular, maintaining continuous connections between a user equipment (UE) and non-3GPP access networks involves providing constant and secure tunnels (e.g., Internet Protocol Security (IPSec) tunnels) and sessions, which may persist even without active data exchange.

BRIEF DESCRIPTION OF THE DRAWINGS

FIG. 4 is a flowchart of an example process for providing priority for a UE associated with a non-3GPP access network.

DETAILED DESCRIPTION OF EXAMPLE EMBODIMENTS

Figure 1A:
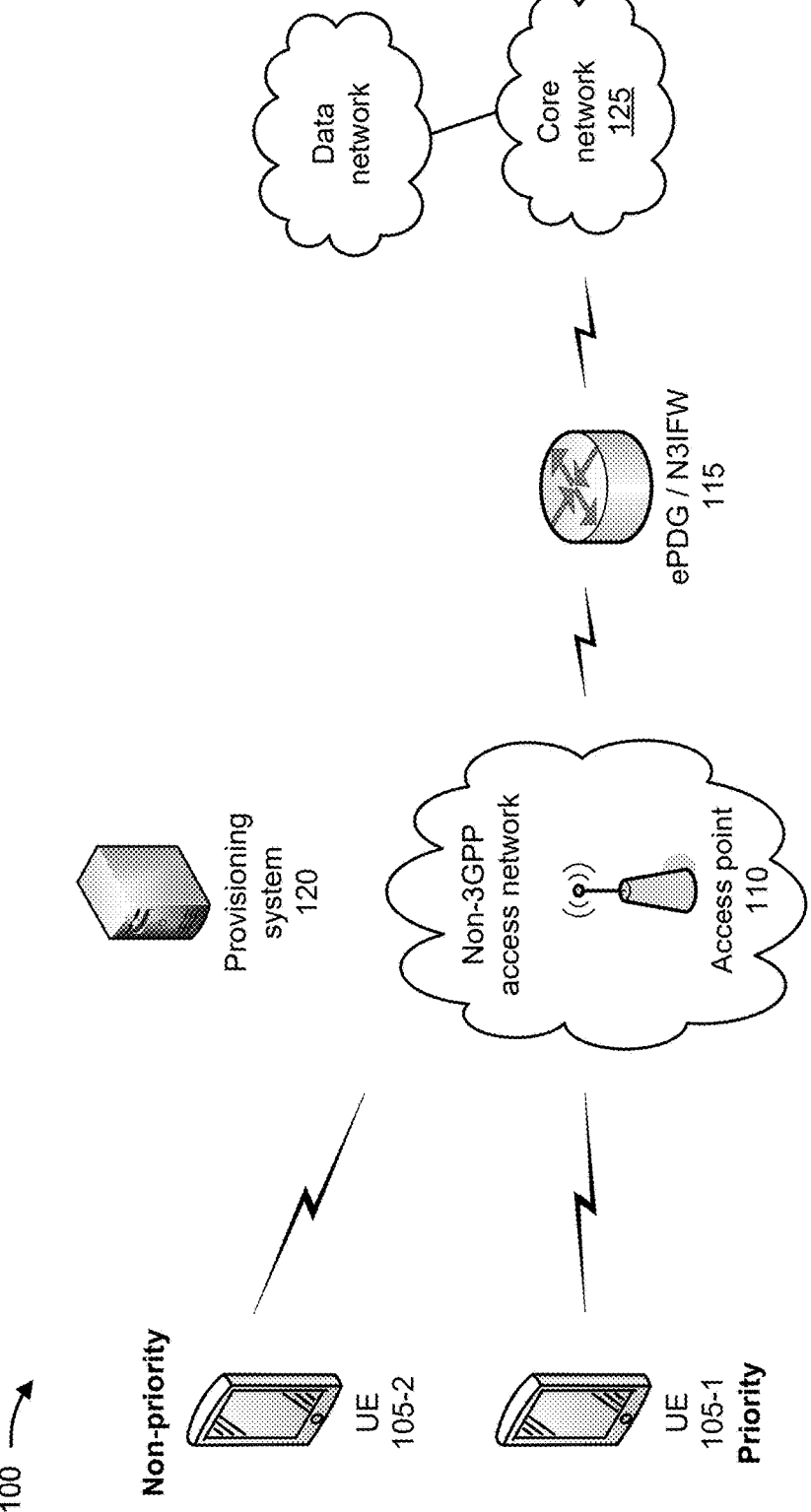
FIGS. 1A-1G are diagrams of an example associated with providing priority for a UE associated with a non-3GPP access network.

The following detailed description of example implementations refers to the accompanying drawings. The same reference numbers in different drawings may identify the same or similar elements.

As the proliferation of Wi-Fi endpoints continues, the inefficiency of non-3GPP access networks becomes increasingly costly, placing a strain on network resources of the non-3GPP access networks as well as corresponding core networks. In the event of congestion in a network device (e.g., an evolved packet data gateway (ePDG) or a non-3GPP interworking function (N3IWF)) linking a non-3GPP access network and a core network, prioritizing critical services (e.g., a multimedia priority service (MPS), a mission-critical service (MCS), and/or the like) becomes even more difficult. The challenge lies in ensuring that these critical services are maintained reliably, despite the congested state of the network device linking the non-3GPP access network and the core network, and without sacrificing security. Thus, current techniques for handling priority services in a network device linking a non-3GPP access network and a core network consume computing resources (e.g., processing resources, memory resources, communication resources, and/or the like), networking resources, and/or other resources associated with failing to provide critical services when the network device is congested, handling data breaches associated with incorrectly providing critical services when the network device is congested, unnecessarily maintaining continuous connections between UEs and the non-3GPP access network, and/or the like.

Some implementations described herein relate to a network device that provides priority for a UE associated with a non-3GPP access network. For example, the network device may receive a first private certificate associated with a first UE and a second private certificate associated with a second UE, and may provision the network device with the first private certificate and the second private certificate. The network device may receive, from the first UE, an encrypted first request, such as an encrypted first Internet key exchange (IKE) security association (SA) initialization (INIT) request, with a first payload that includes a priority indicator, and may decrypt the encrypted first request with the first private certificate. The network device may receive, from the second UE, an encrypted second request, such as an encrypted IKE SA INIT request, with a second payload that does not include the priority indicator, and may decrypt the encrypted second request with the second private certificate. The network device may detect congestion associated with the network device, and may prioritize traffic from the first UE over traffic from the second UE based on the congestion and based on the priority indicator being in the first request and not in the second request.

In this way, a network device provides priority for a UE associated with a non-3GPP access network. For example, the network device may receive encrypted IKE SA INIT requests from UEs, and may decrypt the encrypted IKE SA INIT requests using private certificates specific to each of the UEs. The IKE SA INIT requests may each include a priority indicator (e.g., with different priorities within a range of values, such as zero to nine), allowing the network device to differentiate between traffic from UEs that requires prioritized handling and ordinary traffic. In some implementations, upon detection of congestion, the network device may prioritize traffic from UEs with the priority indicator in the IKE SA INIT request over traffic from UEs without the priority indicator. Thus, the network device may conserve computing resources, networking resources, and/or other resources that would have otherwise been consumed by failing to provide critical services when the network device is congested, handling data breaches associated with incorrectly providing critical services when the network device is congested, unnecessarily maintaining continuous connections between UEs and the non-3GPP access network, and/or the like.

FIGS. 1A-1G are diagrams of an example 100 associated with providing priority for a UE associated with a non-3GPP access network. As shown in FIG. 1A, the example 100 includes a first UE 105-1 (e.g., a priority UE), a second UE 105-2 (e.g., a non-priority UE), an access point 110 providing a non-3GPP access network, an evolved packet data gateway (ePDG)/non-3GPP interworking function (N3IWF) 115, a provisioning system 120, a data network, and a core network 125. As further shown in FIG. 1A, the first UE 105-1 may be associated with a high priority service, such as a multimedia priority service (MPS), a mission-critical service (MCS) (e.g., a public safety service), a high priority enterprise service, and/or the like, and the second UE 105-2 may not be associated with a high priority service. Further details of the UEs 105, the access point 110, the non-3GPP access network, the ePDG/N3IFW 115, the provisioning system 120, the data network, and the core network 125 are provided elsewhere herein.

Figure 1B:
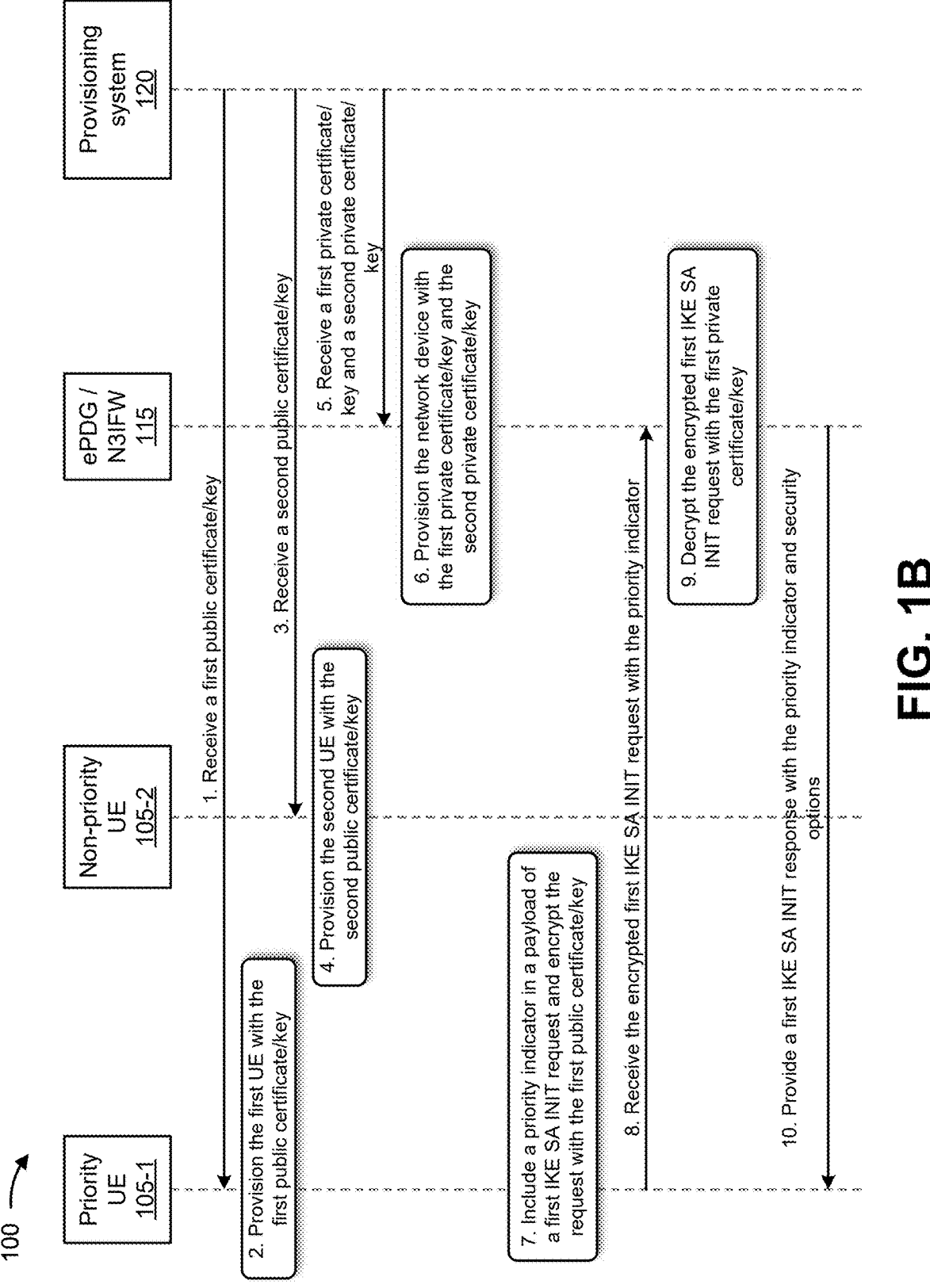
Figure 1C:
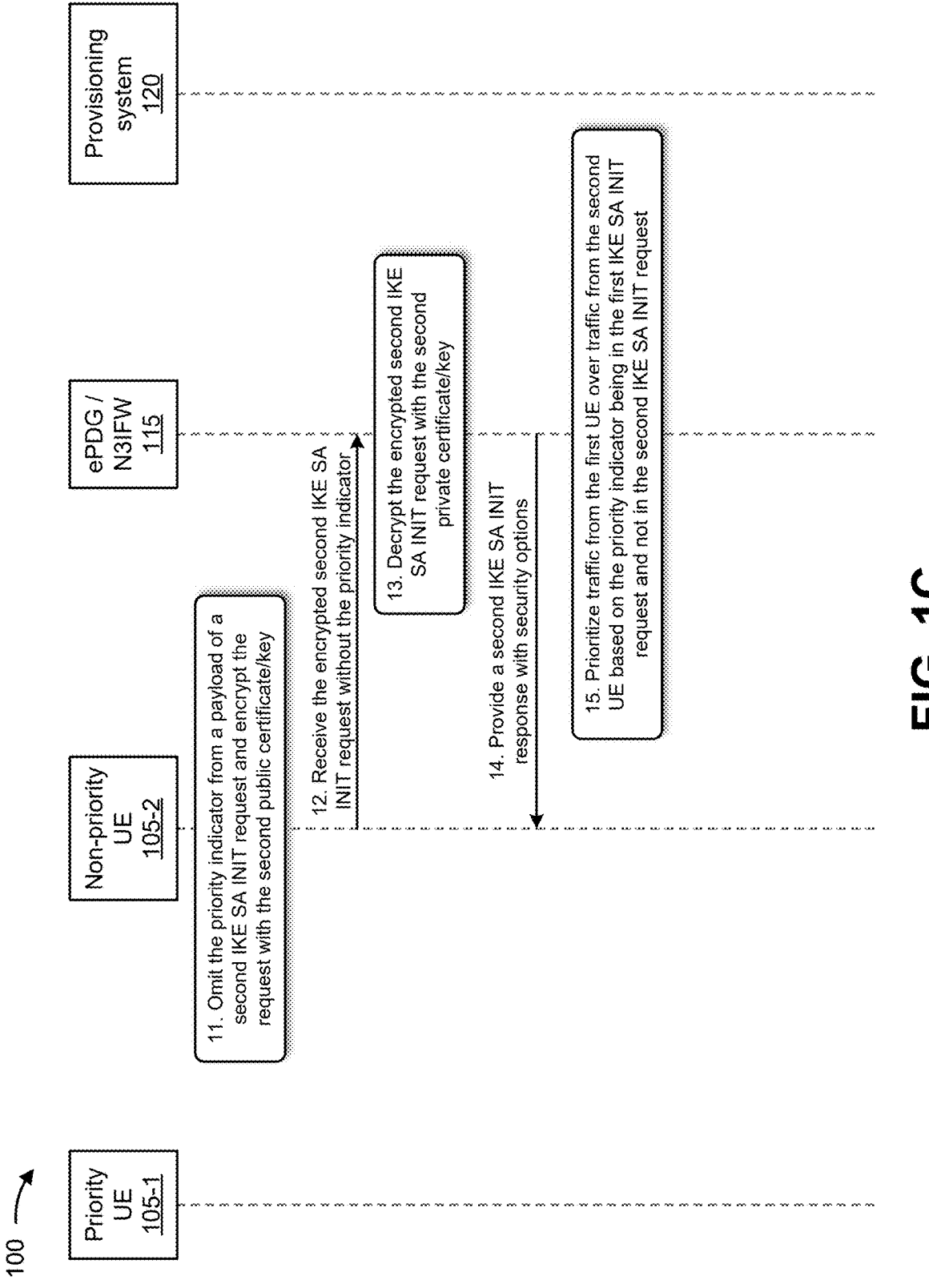

FIGS. 1B and 1C depict an example information flow diagram associated with providing priority for a UE 105 associated with a non-3GPP access network. As shown at step 1 of FIG. 1B, the first UE 105-1 may receive a first public certificate/key from the provisioning system 120. For example, the first UE 105-1 may establish a communication link with the provisioning system 120 to receive the first public certificate/key. The provisioning system 120 may provide the first public certificate/key to the first UE 105-1 via the communication link, and the first UE 105-1 may receive the first public certificate/key. In some implementations, the first public certificate/key may be pre-loaded onto the first UE 105-1 during manufacturing. The pre-loading process may ensure that the first UE 105-1 comes equipped with the first public certificate/key, thus eliminating the need for initial communication link establishment with the provisioning system 120.

As shown at step 2, the first UE 105-1 may provision the first UE 105-1 with the first public certificate/key. For example, the first UE 105-1 may provision the first UE 105-1 with the first public certificate/key by storing the first public certificate/key locally and utilizing the first public certificate/key for subsequent secure communications. In some implementations, the first UE 105-1 may store the first public certificate/key in a secure hardware element rather than just locally. Secure hardware elements may provide an additional layer of protection against unauthorized access to the first public certificate/key.

As shown at step 3, the second UE 105-2 may receive a second public certificate/key from the provisioning system 120. For example, the second UE 105-2 may establish a communication link with the provisioning system 120 to receive the second public certificate/key. The provisioning system 120 may provide the second public certificate/key to the second UE 105-2 via the communication link, and the second UE 105-2 may receive the second public certificate/key. In some implementations, the second public certificate/key may be pre-loaded onto the second UE 105-2 during manufacturing. The pre-loading process may ensure that the second UE 105-2 comes equipped with the second public certificate/key, thus eliminating the need for initial communication link establishment with the provisioning system 120.

As shown at step 4, the second UE 105-2 may provision the second UE 105-2 with the second public certificate/key. For example, the second UE 105-2 may provision the second UE 105-2 with the second public certificate/key by storing the second public certificate/key locally and utilizing the second public certificate/key for subsequent secure communications. In some implementations, the second UE 105-2 may store the second public certificate/key in a secure hardware element rather than just locally. Secure hardware elements may provide an additional layer of protection against unauthorized access to the second public certificate/key.

As shown at step 5, the ePDG/N3IFW 115 may receive a first private certificate/key and a second private certificate/key from the provisioning system 120. For example, the ePDG/N3IFW 115 may establish a communication link with the provisioning system 120 to receive the first private certificate/key and the second private certificate/key. In some implementations, the ePDG/N3IFW 115 may receive the first private certificate/key and the second private certificate/key from a secure certificate repository managed by a network operator, rather than provisioning system 120. Secure certificate repositories may provide a centralized and controlled environment for certificate management.

As shown at step 6, the ePDG/N3IFW 115 may provision the ePDG/N3IFW 115 with the first private certificate/key and the second private certificate/key. For example, the ePDG/N3IFW 115 may provision the ePDG/N3IFW 115 with the first private certificate/key and the second private certificate/key by storing the first private certificate/key and the second private certificate/key locally and utilizing the first private certificate/key and the second private certificate/key for subsequent secure communications. In some implementations, the ePDG/N3IFW 115 may include using hardware security modules (HSMs) to store the first private certificate/key and the second private certificate/key instead of in local storage. The HSMs may provide enhanced security by isolating cryptographic keys within tamper-resistant hardware.

As shown at step 7, the first UE 105-1 may include a priority indicator in a payload of a first IKE SA INIT request and may encrypt the first IKE SA INIT request with the first public certificate/key to generate an encrypted first IKE SA INIT request. For example, the first UE 105-1 may generate the first IKE SA INIT request, may add the priority indicator to the payload, and may encrypt the first IKE SA INIT request using the first public certificate/key and to generate an encrypted first IKE SA INIT request. In some implementations, the first UE 105-1 may also provide quality of service (QOS) parameters in the payload of the first IKE SA INIT request. The QoS parameters may provide additional context for managing network resources based on service requirements of the first IKE SA INIT request.

As shown at step 8, the ePDG/N3IFW 115 may receive, from the first UE 105-1, the encrypted first IKE SA INIT request with the priority indicator. For example, the first UE 105-1 may provide the encrypted first IKE SA INIT request with the priority indicator to the ePDG/N3IFW 115 over the non-3GPP access network, and the ePDG/N3IFW 115 may receive the encrypted first IKE SA INIT request with the priority indicator. In some implementations, the first UE 105-1 may provide the encrypted first IKE SA INIT request with the priority indicator to the ePDG/N3IFW 115 and over an encrypted virtual private network (VPN). Using the encrypted VPN may provide an additional layer of security by ensuring that the transmission path is also secure.

As shown at step 9, the ePDG/N3IFW 115 may decrypt the encrypted first IKE SA INIT request with the first private certificate/key. For example, the ePDG/N3IFW 115 may use the first private certificate/key to decrypt the encrypted first IKE SA INIT request received from the first UE 105-1. In some implementations, the ePDG/N3IFW 115 may also perform one or more integrity checks on the encrypted first IKE SA INIT request. The integrity checks may verify that the encrypted first IKE SA INIT request has not been tampered with during transmission.

As shown at step 10, the ePDG/N3IFW 115 may provide a first IKE SA INIT response with the priority indicator and security options to the first UE 105-1. For example, the ePDG/N3IFW 115 may generate a first IKE SA INIT response to the first IKE SA INIT request, and may provide the priority indicator and any necessary security options in the first IKE SA INIT response. The ePDG/N3IFW 115 may transmit the first IKE SA INIT response with the priority indicator and security options back to the first UE 105-1. In some implementations, the ePDG/N3IFW 115 may include additional security options, such as perfect forward secrecy (PFS), in the first IKE SA INIT response and may digitally sign the first IKE SA INIT response to ensure authenticity before providing the first IKE SA INIT response to the first UE 105-1. PFS may ensure that session keys are not compromised, and digital signatures may confirm a sender's identity and message integrity.

As shown at step 11 of FIG. 1C, the second UE 105-2 may omit the priority indicator from a payload of a second IKE SA INIT request and may encrypt the second IKE SA INIT request with the second public certificate/key to generate an encrypted second IKE SA INIT request. For example, the second UE 105-2 may generate the second IKE SA INIT request, may omit the priority indicator from the payload of the second IKE SA INIT request, and may encrypt the second IKE SA INIT request using the second public certificate/key to generate the encrypted second IKE SA INIT request. In some implementations, the second UE 105-2 may include a low-priority indicator in the payload of a second IKE SA INIT request rather than omitting the priority indicator from the payload of the second IKE SA INIT request. Additionally, or alternatively, the second UE 105-2 may include multiple parameters related to QoS in the payload of the second IKE SA INIT request before encryption. The QoS parameters may define specific service level agreements (SLAs) or requirements.

As shown at step 12, the ePDG/N3IFW 115 may receive, from the second UE 105-2, the encrypted second IKE SA INIT request without the priority indicator. For example, the second UE 105-2 may provide the encrypted second IKE SA INIT request without the priority indicator to the ePDG/N3IFW 115 over the non-3GPP access network, and the ePDG/N3IFW 115 may receive the encrypted second IKE SA INIT request without the priority indicator. In some implementations, the ePDG/N3IFW 115 may receive the encrypted second IKE SA INIT request with a different priority level indicator as compared to the first IKE SA INIT request. The different priority level indicator may assist the ePDG/N3IFW 115 in applying handling rules for different priority levels. Additionally, or alternatively, the ePDG/N3IFW 115 may receive the encrypted second IKE SA INIT request via a secured Wi-Fi protected access (WPA) encrypted tunnel. The secured tunnel may ensure that the transmission remains protected from eavesdropping or tampering. Additionally, or alternatively, the encrypted second IKE SA INIT request may include additional headers related to network conditions or subscriber identity. Such headers may provide valuable context for handling and routing the request.

As shown at step 13, the ePDG/N3IFW 115 may decrypt the encrypted second IKE SA INIT request with the second private certificate/key. For example, the ePDG/N3IFW 115 may use the second private certificate/key to decrypt the encrypted second IKE SA INIT request received from the second UE 105-2. In some implementations, the ePDG/N3IFW 115 may perform mutual authentication by using the second private certificate/key and validating a cryptographic signature included in the encrypted second IKE SA INIT request. This mutual authentication may ensure that both parties are verified, thereby increasing the security of the communication. Additionally, or alternatively, the ePDG/N3IFW 115 may analyze an integrity check value appended to the encrypted second IKE SA INIT request for additional security verification. This analysis may detect any tampering or corruption of the message during transit.

As shown at step 14, the ePDG/N3IFW 115 may provide a second IKE SA INIT response with security options to the second UE 105-2. For example, the ePDG/N3IFW 115 may generate a second IKE SA INIT response to the second IKE SA INIT request and may provide necessary security options in the second IKE SA INIT response. The ePDG/N3IFW 115 may transmit the second IKE SA INIT response with security options back to the second UE 105-2. In some implementations, the ePDG/N3IFW 115 may include alternative security protocols in the second IKE SA INIT response, such as Diffie-Hellman key exchange or elliptic curve cryptography (ECC). Additionally, or alternatively, the ePDG/N3IFW 115 may provide additional policies, such as bandwidth allocation rules, along with the security options in the second IKE SA INIT response. Additionally, or alternatively, the second IKE SA INIT response may include session timeout parameters to manage the duration of the secure connection.

As shown at step 15, the ePDG/N3IFW 115 may prioritize traffic from the first UE 105-1 over traffic from the second UE 105-2 based on the priority indicator being in the first IKE SA INIT request and not in the second IKE SA INIT request. For example, upon detecting the absence of the priority indicator in the second IKE SA INIT request, the ePDG/N3IFW 115 may allocate network resources to prioritize traffic from the first UE 105-1 over the second UE 105-2 in situations of network congestion or limited capacity. The prioritization may ensure that critical services associated with the first UE 105-1 maintain higher priority during data transmission. In some implementations, the ePDG/N3IFW 115 may dynamically adjust network resource allocation not only based on the presence of the priority indicator but also according to real-time network analytics and congestion status. Additionally, or alternatively, the ePDG/N3IFW 115 may utilize machine learning models to predict and manage traffic prioritization between the first UE 105-1 and the second UE 105-2 based on historical usage patterns.

Figure 1D:
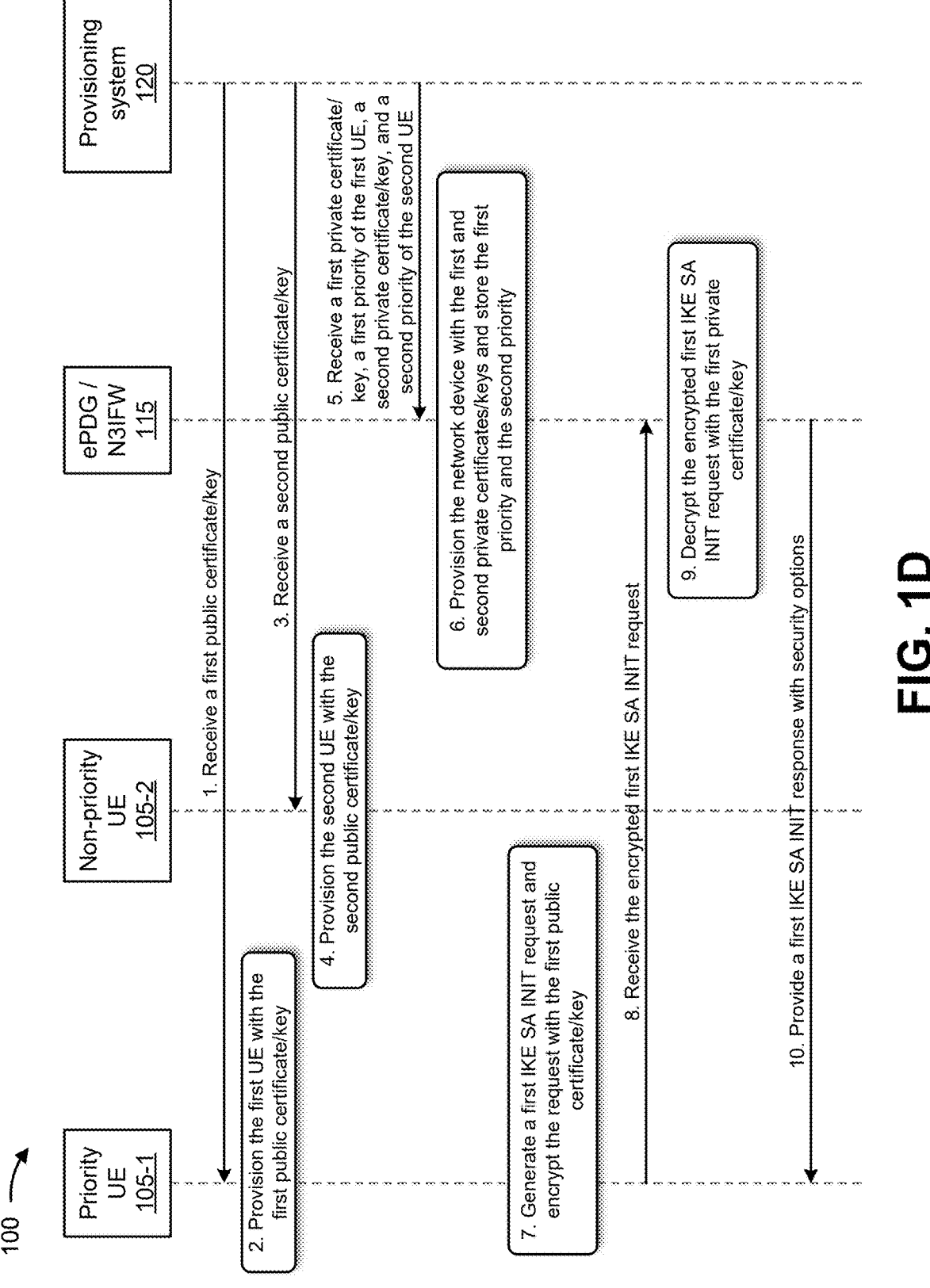
Figure 1E:
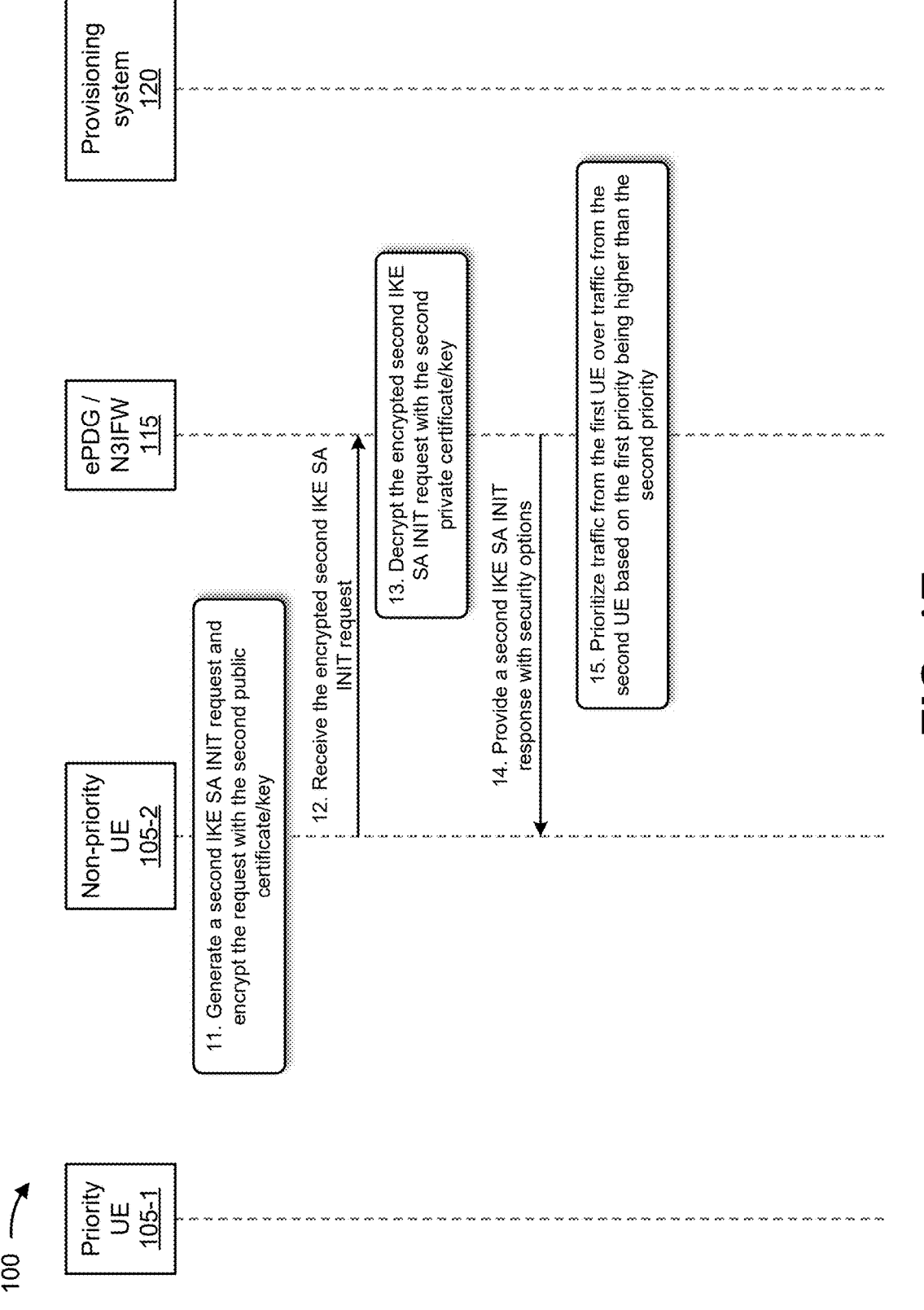

FIGS. 1D and 1E depict another example information flow diagram associated with providing priority for a UE 105 associated with a non-3GPP access network. As shown at step 1 of FIG. 1D, the first UE 105-1 may receive a first public certificate/key from the provisioning system 120. For example, step 1 of FIG. 1D may include the same features described above in connection with step 1 of FIG. 1B.

As shown at step 2, the first UE 105-1 may provision the first UE 105-1 with the first public certificate/key. For example, step 2 of FIG. 1D may include the same features described above in connection with step 2 of FIG. 1B.

As shown at step 3, the second UE 105-2 may receive a second public certificate/key from the provisioning system 120. For example, step 3 of FIG. 1D may include the same features described above in connection with step 3 of FIG. 1B.

As shown at step 4, the second UE 105-2 may provision the second UE 105-2 with the second public certificate/key. For example, step 4 of FIG. 1D may include the same features described above in connection with step 4 of FIG. 1B.

As shown at step 5, the ePDG/N3IFW 115 may receive a first private certificate/key, a first priority of the first UE 105-1, a second private certificate/key, and a second priority of the second UE 105-2 from the provisioning system 120. For example, the ePDG/N3IFW 115 may establish a communication link with the provisioning system 120 to receive the first private certificate/key, the first priority of the first UE 105-1, the second private certificate/key, and the second priority of the second UE 105-2. In some implementations, the provisioning system 120 may provide the certificates/keys and priorities to the ePDG/N3IFW 115 to ensure secure communications and prioritized handling of critical services. Additionally, or alternatively, the provisioning system 120 may also provide, to the ePDG/N3IFW 115, configuration files for secure communication handling by the ePDG/N3IFW 115. Such configuration files may include predefined settings which facilitate a more streamlined and secure communication setup. Additionally, or alternatively, the ePDG/N3IFW 115 may establish a secure communication link with the provisioning system 120 using a VPN or other secure protocol to receive the first and second private certificates/keys and their respective priorities.

As shown at step 6, the ePDG/N3IFW 115 may provision the ePDG/N3IFW 115 with the first private certificate/key and the second private certificate/key, and may store the first priority and the second priority. For example, the ePDG/

N3IFW 115 may provision the ePDG/N3IFW 115 with the first private certificate/key and the second private certificate/key by storing the certificates/keys and the priorities in a secure local storage or an HSM, which may offer protection against unauthorized access and tampering. The storage of the priorities may enable the ePDG/N3IFW 115 to prioritize communication traffic. In some implementations, the ePDG/N3IFW 115 may provision the received certificates/keys and priorities in multiple HSMs for redundancy and load balancing. Additionally, or alternatively, the ePDG/N3IFW 115 may use cloud-based secure storage to store the first private certificate/key and the second private certificate/key along with their respective priorities. Additionally, or alternatively, the ePDG/N3IFW 115 may periodically update and validate the stored certificates/keys and priorities to ensure continuous secure communications.

As shown at step 7, the first UE 105-1 may generate a first IKE SA INIT request and may encrypt the first IKE SA INIT request with the first public certificate/key to generate an encrypted first IKE SA INIT request. For example, the first UE 105-1 may generate the first IKE SA INIT request, and may use the first public certificate/key to encrypt the first IKE SA INIT request and to generate the encrypted first IKE SA INIT request. The encryption may ensure that the first IKE SA INIT request is protected from interception and unauthorized access during transmission. In some implementations, the first IKE SA INIT request may include additional security parameters. Additionally, or alternatively, the first UE 105-1 may digitally sign the first IKE SA INIT request using the first public certificate/key to further enhance message integrity before encryption. Additionally, or alternatively, the first UE 105-1 may use a dual-key encryption method, where the first IKE SA INIT request is encrypted using the first public certificate/key and a secondary temporary session key.

As shown at step 8, the ePDG/N3IFW 115 may receive, from the first UE 105-1, the encrypted first IKE SA INIT request. For example, the encrypted first IKE SA INIT request transmitted by the first UE 105-1 may be received by the ePDG/N3IFW 115 over the non-3GPP access network. Additionally, or alternatively, the ePDG/N3IFW 115 may log and monitor the encrypted first IKE SA INIT request for auditing purposes in adherence with compliance standards. Logging and monitoring may ensure that any anomalies or security incidents can be traced and investigated. Additionally, or alternatively, the ePDG/N3IFW 115 may validate the encrypted first IKE SA INIT request using a hash verification process before decrypting the encrypted first IKE SA INIT request.

As shown at step 9, the ePDG/N3IFW 115 may decrypt the encrypted first IKE SA INIT request with the first private certificate/key. For example, the ePDG/N3IFW 115 may use the first private certificate/key, received from the provisioning system 120, to decrypt the encrypted first IKE SA INIT request. In some implementations, the ePDG/N3IFW 115 may decrypt the encrypted first IKE SA INIT request, and if decryption is successful, may timestamp the first IKE SA INIT request for additional security verification against replay attacks. Additionally, or alternatively, the decryption process may include multi-factor authentication where the first private certificate/key is used in combination with a secondary security token. This multi-factor approach bolsters the security by ensuring that multiple forms of verification are required.

As shown at step 10, the ePDG/N3IFW 115 may provide a first IKE SA INIT response with security options to the first UE 105-1. For example, the ePDG/N3IFW 115 may generate the first IKE SA INIT response that includes the security options. The first IKE SA INIT response may be provided to the first UE 105-1 to complete the initialization of the secure communication channel. In some implementations, the first IKE SA INIT response may include not only security options but also QoS parameters to ensure high-priority handling. The QoS parameters may guarantee that the communication has the necessary bandwidth and latency characteristics. Additionally, or alternatively, the first IKE SA INIT response may include a session identifier that is tied to the priority of the first UE 105-1 to facilitate subsequent communications.

As shown at step 11 of FIG. 1E, the second UE 105-2 may generate a second IKE SA INIT request and may encrypt the second IKE SA INIT request with the second public certificate/key to generate an encrypted second IKE SA INIT request. For example, the second UE 105-2 may generate the second IKE SA INIT request and may use the second public certificate/key to encrypt the request and generate the encrypted second IKE SA INIT request. The encryption may ensure that the second IKE SA INIT request is protected from interception and unauthorized access during transmission. In some implementations, the second IKE SA INIT request may include additional security parameters. Additionally, or alternatively, the second UE 105-2 may digitally sign the second IKE SA INIT request using the second public certificate/key to further enhance message integrity before encryption. Additionally, or alternatively, the second UE 105-2 may use a dual-key encryption method, where the second IKE SA INIT request is encrypted using the second public certificate/key and a secondary temporary session key. In some implementations, the second IKE SA INIT request may include additional metadata relevant to network operations, such as QoS parameters or session parameters.

As shown at step 12, the ePDG/N3IFW 115 may receive, from the second UE 105-2, the encrypted second IKE SA INIT request. For example, the second UE 105-2 may transmit the encrypted second IKE SA INIT request to the ePDG/N3IFW 115 over the non-3GPP access network. Additionally, or alternatively, the encrypted second IKE SA INIT request may be received through a secure tunnel established between the second UE 105-2 and the ePDG/N3IFW 115. Using a secure tunnel provides an encrypted pathway that prevents eavesdropping and unauthorized access during transmission. Additionally, or alternatively, the ePDG/N3IFW 115 may receive the encrypted second IKE SA INIT request and verify receipt through a handshake protocol. An implemented handshake protocol verifies and confirms secure establishment between the second UE 105-2 and the ePDG/N3IFW 115.

As shown at step 13, the ePDG/N3IFW 115 may decrypt the encrypted second IKE SA INIT request with the second private certificate/key. For example, the ePDG/N3IFW 115 may use the second private certificate/key to decrypt the encrypted second IKE SA INIT request. In some implementations, the ePDG/N3IFW 115 may perform integrity checks and validation to ensure that the encrypted second IKE SA INIT request has not been tampered with and is authentic. Additionally, or alternatively, the ePDG/N3IFW 115 may decrypt the encrypted second IKE SA INIT request and validate its contents using integrity verification methods to prevent tampering.

As shown at step 14, the ePDG/N3IFW 115 may provide a second IKE SA INIT response with security options to the second UE 105-2. For example, the ePDG/N3IFW 115, after successfully decrypting the second IKE SA INIT request, may generate and transmit the second IKE SA INIT response back to the second UE 105-2. The second IKE SA INIT response may include security options to establish a secure communication session between the second UE 105-2 and the core network 125. Additionally, or alternatively, the ePDG/N3IFW 115 may include encryption keys or additional security descriptors in the second IKE SA INIT response for establishing a secure channel. Additionally, or alternatively, a second IKE SA INIT response may include security configuration parameters that the second UE 105-2 will use for secure communication. Additionally, or alternatively, the second IKE SA INIT response may include session-specific security controls.

As shown at step 15, the ePDG/N3IFW 115 may prioritize traffic from the first UE 105-1 over traffic from the second UE 105-2 based on the first priority being higher than the second priority. For example, upon detecting network congestion and reviewing the priority indicators, the ePDG/N3IFW 115 may allocate resources to prioritize the data traffic from the first UE 105-1, which has a higher priority, over the second UE 105-2. This prioritization may ensure that critical services associated with the first UE 105-1 are maintained even during periods of network congestion. Additionally, or alternatively, traffic management decisions involving preferential resource allocation may be influenced by the priority indicators received in both IKE SA INIT requests. Utilizing the priority indicators, the ePDG/N3IFW 115 can make dynamic traffic management decisions favoring essential traffic. Additionally, or alternatively, the ePDG/N3IFW 115 may implement a dynamic resource allocation strategy ensuring that the higher-priority traffic from the first UE 105-1 is maintained during network strain.

Figure 1F:
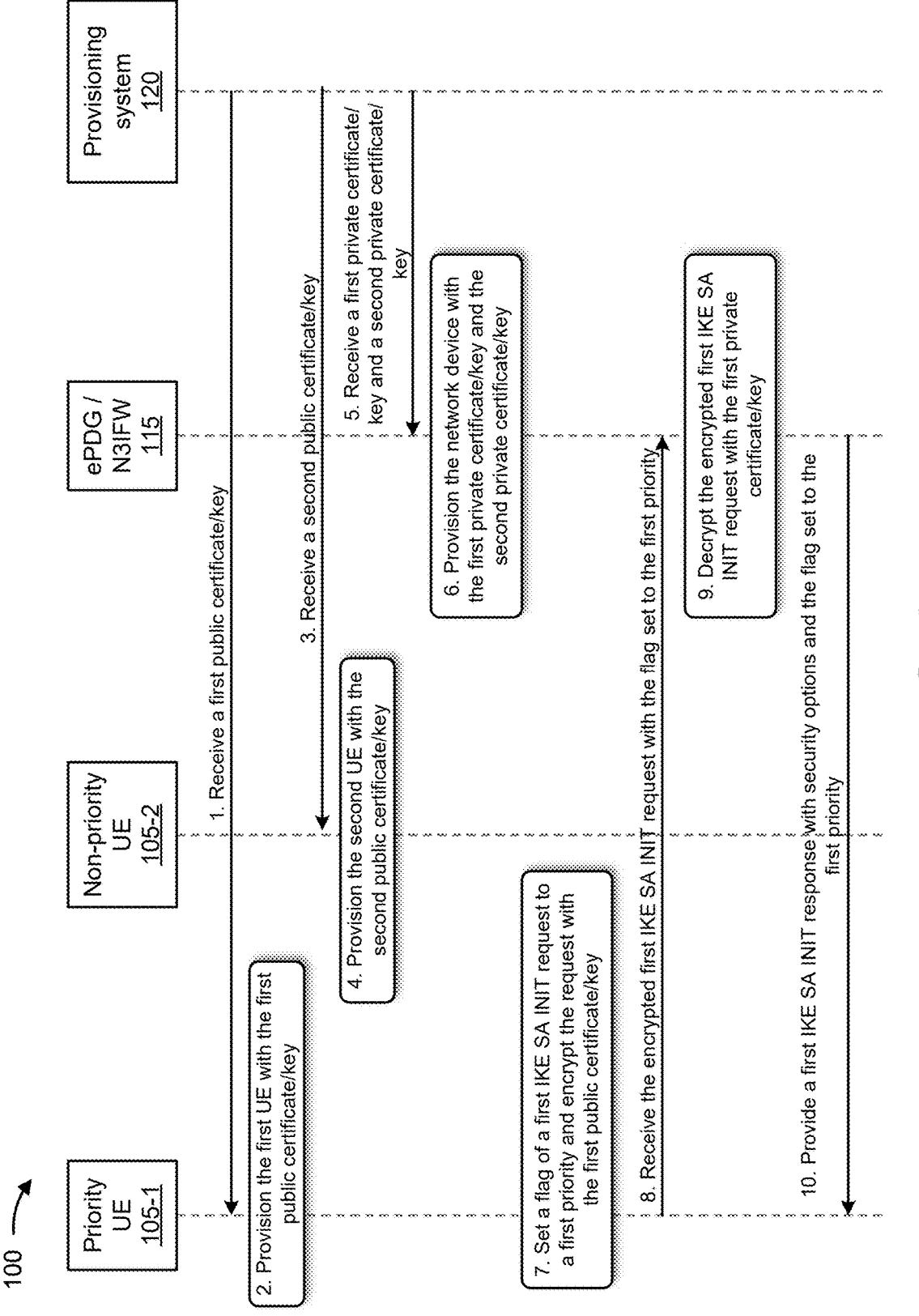
Figure 1G:
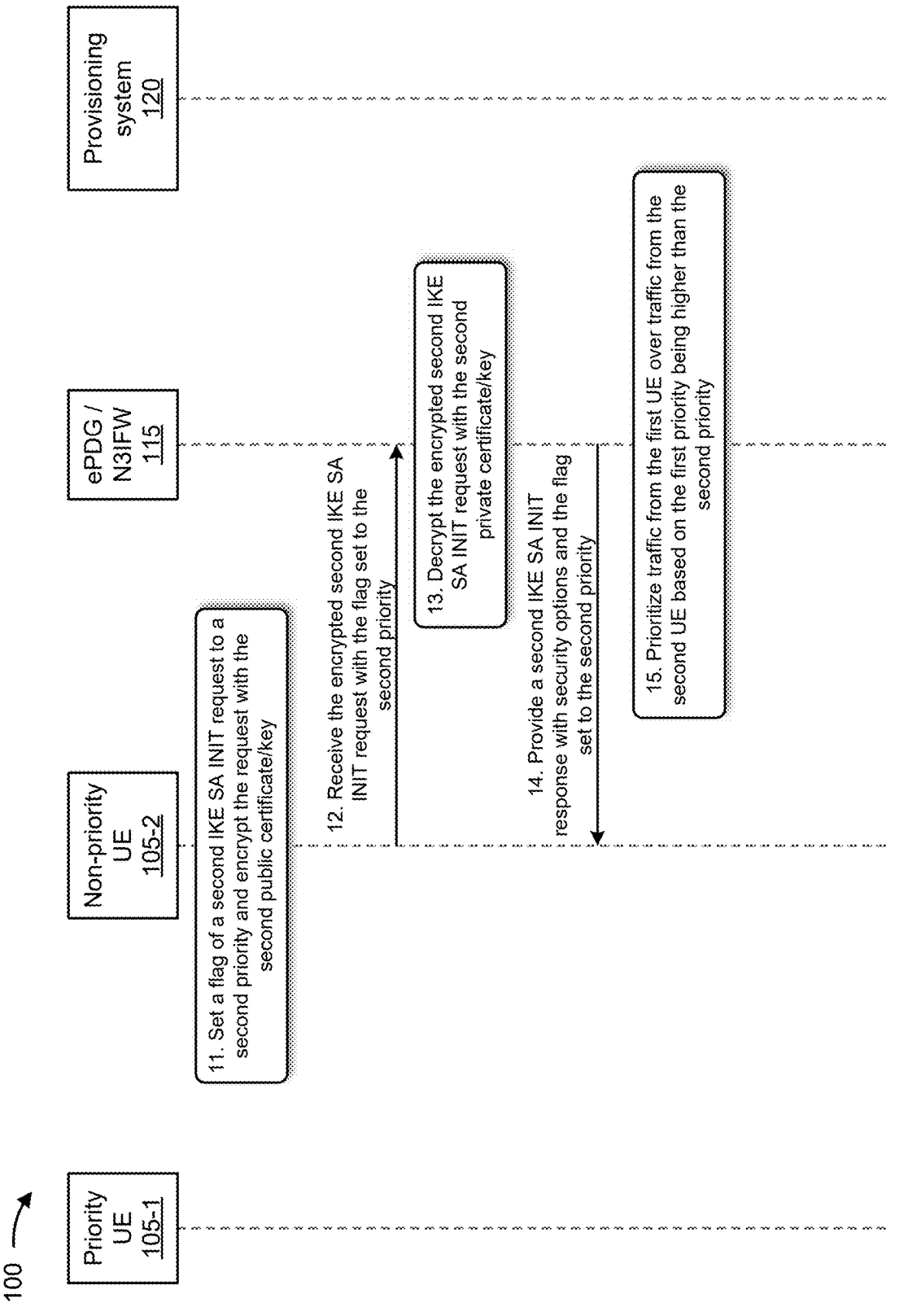

FIGS. 1F and 1G depict still another example information flow diagram associated with providing priority for a UE 105 associated with a non-3GPP access network. As shown at step 1 of FIG. 1F, the first UE 105-1 may receive a first public certificate/key from the provisioning system 120. For example, step 1 of FIG. 1F may include the same features described above in connection with step 1 of FIG. 1B.

As shown at step 2, the first UE 105-1 may provision the first UE 105-1 with the first public certificate/key. For example, step 2 of FIG. 1F may include the same features described above in connection with step 2 of FIG. 1B.

As shown at step 3, the second UE 105-2 may receive a second public certificate/key from the provisioning system 120. For example, step 3 of FIG. 1F may include the same features described above in connection with step 3 of FIG. 1B.

As shown at step 4, the second UE 105-2 may provision the second UE 105-2 with the second public certificate/key. For example, step 4 of FIG. 1F may include the same features described above in connection with step 4 of FIG. 1B.

As shown at step 5, the ePDG/N3IFW 115 may receive a first private certificate/key and a second private certificate/key from the provisioning system 120. For example, the ePDG/N3IFW 115 may establish a communication link with the provisioning system 120 to receive the first private certificate/key and the second private certificate/key. In some implementations, the ePDG/N3IFW 115 may receive the first private certificate/key and the second private certificate/key from a secure certificate repository managed by a network operator, rather than provisioning system 120. Secure certificate repositories may provide a centralized and controlled environment for certificate management.

As shown at step 6, the ePDG/N3IFW 115 may provision the ePDG/N3IFW 115 with the first private certificate/key and the second private certificate/key. For example, the ePDG/N3IFW 115 may provision the ePDG/N3IFW 115 with the first private certificate/key and the second private certificate/key by storing the first private certificate/key and the second private certificate/key locally and utilizing the first private certificate/key and the second private certificate/key for subsequent secure communications. In some implementations, the ePDG/N3IFW 115 may use HSMs to store the first private certificate/key and the second private certificate/key instead of in local storage. The HSMs may provide enhanced security by isolating cryptographic keys within tamper-resistant hardware. Additionally, or alternatively, the ePDG/N3IFW 115 may utilize a distributed ledger or a blockchain to store the certificates for extra assurance of tamper-resistance. Using distributed ledger technology, each certificate may be stored with a verifiable and tamper-proof record of its issuance and usage.

As shown at step 7, the first UE 105-1 may set a flag of a first IKE SA INIT request to a first priority and may encrypt the first IKE SA INIT request with the first public certificate/key to generate an encrypted first IKE SA INIT request. For example, the first UE 105-1 may generate the first IKE SA INIT request, and may set the flag indicating the first priority in the first IKE SA INIT request. The first UE 105-1 may encrypt the first IKE SA INIT request using the first public certificate/key and to generate the encrypted first IKE SA INIT request. In some implementations, the first UE 105-1 may also provide QoS parameters in the payload of the first IKE SA INIT request. In some implementations, the first UE 105-1 may utilize an alternative signal, such as a specific bit field, instead of a flag to indicate priority. A specific bit field may provide for more granular control over priority levels. Additionally, or alternatively, instead of setting just a flag, the first UE 105-1 may utilize priority levels or classes (e.g., ranging from zero to seven). Using priority levels or classes allows for a more detailed and hierarchical priority system for handling the request. Additionally, or alternatively, the encryption may include a combination of multiple public keys for multi-factor security. Additionally, or alternatively, the first IKE SA INIT request may also include additional metadata, such as the service type or user profile for better QoS determination.

As shown at step 8, the ePDG/N3IFW 115 may receive, from the first UE 105-1, the encrypted first IKE SA INIT request with the flag set to the first priority. For example, the first UE 105-1 may provide the encrypted first IKE SA INIT request with the flag indicating the first priority to the ePDG/N3IFW 115 over the non-3GPP access network, and the ePDG/N3IFW 115 may receive the encrypted first IKE SA INIT request with the flag set to the first priority. In some implementations, the first UE 105-1 may provide the encrypted first IKE SA INIT request to the ePDG/N3IFW 115 over an encrypted VPN. Additionally, or alternatively, instead of using a VPN, a secure tunnel like an IPSec directly to the ePDG/N3IFW 115 may be implemented. Additionally, or alternatively, device-specific tokens or session IDs may accompany the encrypted first IKE SA INIT request to authenticate and validate the first UE 105-1 before decryption.

As shown at step 9, the ePDG/N3IFW 115 may decrypt the encrypted first IKE SA INIT request with the first private certificate/key. For example, the ePDG/N3IFW 115 may use the first private certificate/key to decrypt the encrypted first IKE SA INIT request received from the first UE 105-1. In some implementations, the ePDG/N3IFW 115 may also perform one or more integrity checks on the encrypted first IKE SA INIT request. The integrity checks may verify that the encrypted first IKE SA INIT request has not been tampered with during transmission. In some implementations, the encrypted IKE SA INIT request may be decrypted using a symmetric key model instead of the private certificate. Additionally, or alternatively, ePDG/N3IFW 115 may utilize a combination of hardware acceleration and software methods for faster decryption.

As shown at step 10, the ePDG/N3IFW 115 may provide, to the first UE 105-1, a first IKE SA INIT response with security options and the flag set to the first priority. For example, the ePDG/N3IFW 115 may generate the first IKE SA INIT response to the first IKE SA INIT request, and may provide the security options and the flag indicating the first priority in the first IKE SA INIT response. The ePDG/N3IFW 115 may transmit the first IKE SA INIT response with the security options and the flag set to the first priority back to the first UE 105-1. In some implementations, the ePDG/N3IFW 115 may include additional security options, such as PFS, in the first IKE SA INIT response and may digitally sign the first IKE SA INIT response to ensure authenticity before providing the first IKE SA INIT response to the first UE 105-1.

As shown at step 11 of FIG. 1G, the second UE 105-2 may set a flag of a second IKE SA INIT request to a second priority and may encrypt the second IKE SA INIT request with the second public certificate/key to generate an encrypted second IKE SA INIT request. For example, the second UE 105-2 may generate the second IKE SA INIT request, may set the flag indicating the second priority in the second IKE SA INIT request, and may encrypt the second IKE SA INIT request using the second public certificate/key to generate the encrypted second IKE SA INIT request. In some implementations, the second UE 105-2 may digitally sign the second IKE SA INIT request using the second public certificate/key before encryption. Additionally, or alternatively, the second UE 105-2 may include a timestamp or nonce values in the second IKE SA INIT request for added security verification. Additionally, or alternatively, instead of a flag, the second UE 105-2 may use a priority field in the second IKE SA INIT request to indicate the priority level. Additionally, or alternatively, the second UE 105-2 may append a policy signature to the payload that dictates handling rules for the encrypted second IKE SA INIT request. The policy signature can include rules and conditions for processing the request, ensuring that it adheres to certain security and operational policies.

As shown at step 12, the ePDG/N3IFW 115 may receive, from the second UE 105-2, the encrypted second IKE SA INIT request with the flag set to the second priority. For example, the encrypted second IKE SA INIT request may be transmitted by the second UE 105-2 over the non-3GPP access network and received by the ePDG/N3IFW 115. In some implementations, the ePDG/N3IFW 115 may receive the encrypted second IKE SA INIT request via a secure tunnel, such as an IPSec tunnel, providing an additional layer of security. Additionally, or alternatively, the ePDG/N3IFW 115 may perform an initial filtering to discard unauthorized or malformed IKE SA INIT requests before processing. Additionally, or alternatively, the ePDG/N3IFW 115 may verify a digital signature (if included) of the second IKE SA INIT request before decrypting the second IKE SA INIT request. Additionally, or alternatively, the ePDG/N3IFW 115 may receive an encapsulated version of the second IKE SA INIT request within a transport layer security (TLS) session for added security.

As shown at step 13, the ePDG/N3IFW 115 may decrypt the encrypted second IKE SA INIT request with the second private certificate/key. For example, the ePDG/N3IFW 115 may use the second private certificate/key to decrypt the encrypted second IKE SA INIT request received from the second UE 105-2. In some implementations, the ePDG/N3IFW 115 may perform integrity checks on the encrypted second IKE SA INIT request to ensure its authenticity and that it has not been tampered with during transmission. Additionally, or alternatively, the ePDG/N3IFW 115 may use a combination of public and private keys for decrypting the encrypted second IKE SA INIT request. Additionally, or alternatively, the ePDG/N3IFW 115 may consult a trusted third-party key management service for certificate validation during decryption. Additionally, or alternatively, the ePDG/N3IFW 115 may verify the integrity of the second IKE SA INIT request using hash-based methods. Additionally, or alternatively, the ePDG/N3IFW 115 may log details of the decryption process for audit and compliance purposes.

As shown at step 14, the ePDG/N3IFW 115 may provide, to the second UE 105-2, a second IKE SA INIT response with security options and the flag set to the second priority. For example, the ePDG/N3IFW 115 may generate the second IKE SA INIT response to the decrypted second IKE SA INIT request, and may include security options and the flag set to the second priority in the second IKE SA INIT response. The ePDG/N3IFW 115 may transmit the second IKE SA INIT response back to the second UE 105-2. In some implementations, the second IKE SA INIT response may include additional parameters, such as PFS, for enhanced security. Additionally, or alternatively, the ePDG/N3IFW 115 may determine adaptive security options based on current network load and QoS parameters when generating the second IKE SA INIT response. Additionally, or alternatively, the ePDG/N3IFW 115 may include authentication tokens in the second IKE SA INIT response to ensure ongoing session integrity. Additionally, or alternatively, the ePDG/N3IFW 115 may offer alternative encryption algorithms to the second UE 105-2 within the second IKE SA INIT response for optimized security. Additionally, or alternatively, the second IKE SA INIT response may contain network condition metrics that help the second UE 105-2 adjust subsequent communication parameters.

As shown at step 15, the ePDG/N3IFW 115 may prioritize traffic from the first UE 105-1 over traffic from the second UE 105-2 based on the first priority being higher than the second priority. For example, upon detecting network congestion, the ePDG/N3IFW 115 may allocate network resources to prioritize traffic from the first UE 105-1, which has a higher priority, over traffic from the second UE 105-2. This may ensure that critical services associated with the first UE 105-1 are maintained even during periods of network congestion. In some implementations, the ePDG/N3IFW 115 may dynamically adjust resource allocation based on real-time network analytics and congestion status. Additionally, or alternatively, the ePDG/N3IFW 115 may queue traffic from the first UE 105-1 and allocate a higher portion of bandwidth resources even at lower traffic volumes. This may ensure that high-priority traffic receives sufficient bandwidth regardless of overall network usage. Additionally, or alternatively, in addition to prioritizing traffic, the ePDG/N3IFW 115 may route traffic from the first UE 105-1 through less congested network paths. Additionally, or alternatively, the ePDG/N3IFW 115 may use machine learning models to predict future congestion and pre-emptively prioritize traffic from the first UE 105-1 accordingly. Additionally, or alternatively, dynamic load balancing strategies may be employed by the ePDG/N3IFW 115 to flexibly adjust traffic prioritization based on varying network conditions. This approach enables the system to adapt to changing network demands efficiently.

In this way, a network device provides priority for a UE 105 associated with a non-3GPP access network. For example, the network device may receive encrypted IKE SA INIT requests from UEs 105, and may decrypt the encrypted IKE SA INIT requests using private certificates specific to each of the UEs 105. The IKE SA INIT requests may each include a priority indicator, allowing the network device to differentiate between traffic from UEs 105 that requires prioritized handling and ordinary traffic. In some implementations, upon detection of congestion, the network device may prioritize traffic from UEs 105 with the priority indicator in the IKE SA INIT request over traffic from UEs 105 without the priority indicator. Thus, the network device may conserve computing resources, networking resources, and/or other resources that would have otherwise been consumed by failing to provide critical services when the network device is congested, handling data breaches associated with incorrectly providing critical services when the network device is congested, unnecessarily maintaining continuous connections between UEs 105 and the non-3GPP access network, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
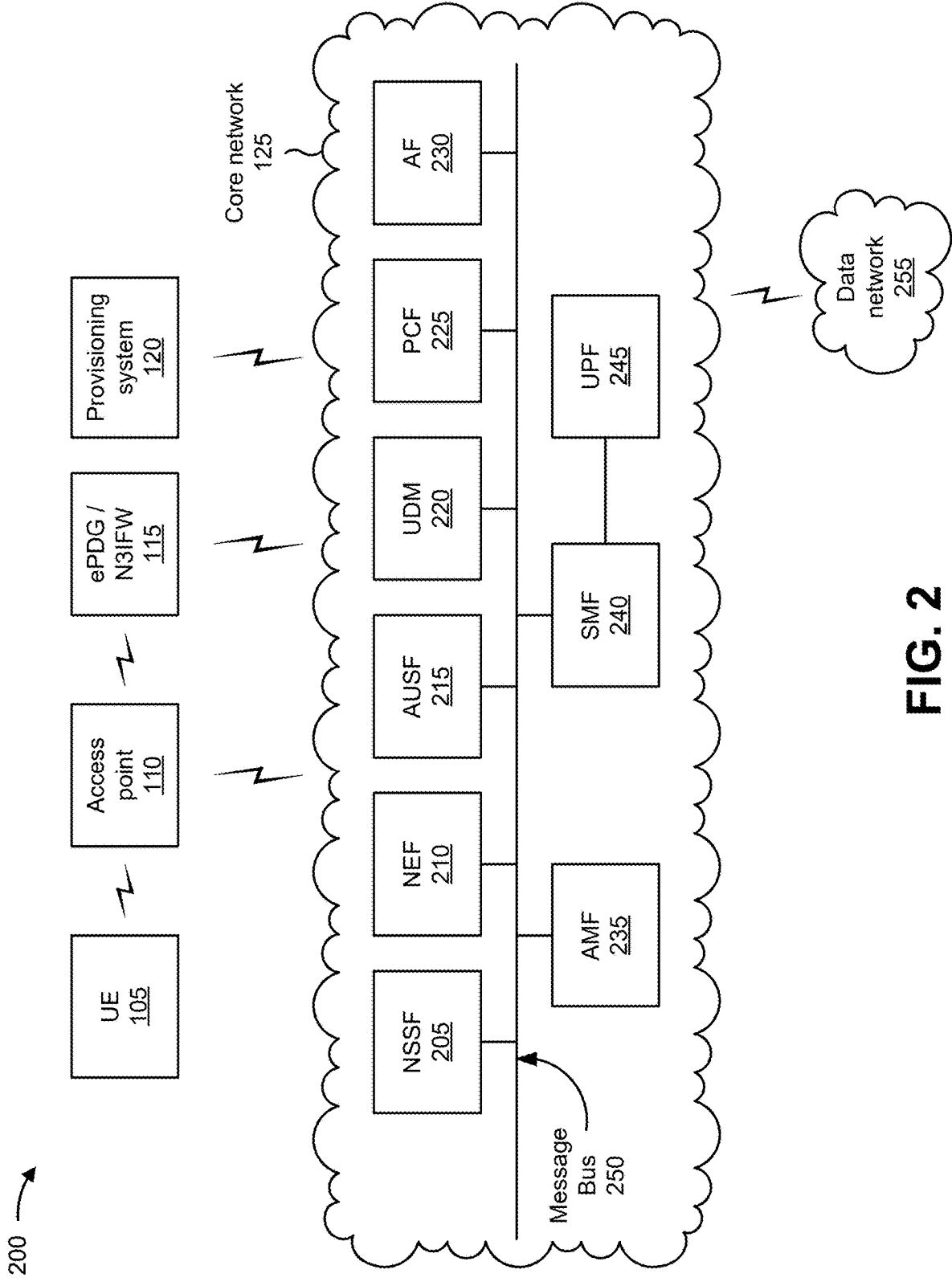
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the UE 105, the access point 110, the ePDG/N3IFW 115, the provisioning system 120, the core network 125, and a data network 255. Devices and/or networks of the example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 may include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The access point 110 may include a network device that allows wireless-capable devices (e.g., the UE 105) to connect to other networks (e.g., a wired network, a wireless network, the core network 125, the data network 255, and/or the like). The access point 110 may generate the non-3GPP access network, which may include a Wi-Fi access network, a WiMAX access network, a fixed access network, a code-division multiple access (CDMA) network, and/or the like. Thus, the access point 110 may include a wireless access point (WAP), a Wi-Fi access network device, a WiMAX access network device, a fixed access network device, a CDMA network device, and/or the like.

The ePDG/N3IFW 115 may include one or more network devices that manage secure and seamless integration of data traffic between non-3GPP access networks and the core network 125. The ePDG/N3IFW 115 may establish secure Internet Protocol security (IPSec) tunnels between the UE 105 and the core network 125, and may ensure that data transmitted over potentially insecure networks (e.g., public Wi-Fi) remains encrypted and protected from eavesdropping or tampering. The ePDG/N3IFW 115 may perform authentication of the UE 105 before allowing access to the core network 125. The ePDG/N3IFW 115 may allocate IP addresses to UEs 105 accessing the core network 125 via non-3GPP access points. The ePDG/N3IFW 115 may route and manage data traffic between non-3GPP access networks and the core network 125, ensuring optimal performance and efficient use of network resources.

The provisioning system 120 may include one or more devices capable of receiving, generating, storing, processing, providing, and/or routing information, as described elsewhere herein. The provisioning system 120 may include a communication device and/or a computing device. For example, the provisioning system 120 may include a server, such as an application server, a client server, a web server, a database server, a host server, a proxy server, a virtual server (e.g., executing on computing hardware), or a server in a cloud computing system. In some implementations, the provisioning system 120 may include computing hardware used in a cloud computing environment.

In some implementations, the core network 125 may include an example functional architecture in which systems and/or methods described herein may be implemented. For example, the core network 125 may include an example architecture of a 5G next generation (NG) core network included in a 5G wireless telecommunications system. While the example architecture of the core network 125 shown in FIG. 2 may be an example of a service-based architecture, in some implementations, the core network 125 may be implemented as a reference-point architecture and/or a 4G core network, among other examples.

As shown in FIG. 2, the core network 125 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, and/or a user plane function (UPF) 245. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the UE 105 in the wireless telecommunications system.

The UDM 220 includes one or more devices that store user data and profiles in the wireless telecommunications system. The UDM 220 may be used for fixed access and/or mobile access in the core network 125.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 240 includes one or more devices that support the establishment, modification, and release of communication sessions in the wireless telecommunications system. For example, the SMF 240 may configure traffic steering policies at the UPF 245 and/or may enforce user equipment Internet protocol (IP) address allocation and policies, among other examples.

The UPF 245 includes one or more devices that serve as an anchor point for intraRAT and/or interRAT mobility. The UPF 245 may apply rules to packets, such as rules pertaining to packet routing, traffic reporting, and/or handling user plane QoS, among other examples.

The message bus 250 represents a communication structure for communication among the functional elements. In other words, the message bus 250 may permit communication between two or more functional elements.

The data network 255 includes one or more wired and/or wireless data networks. For example, the data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
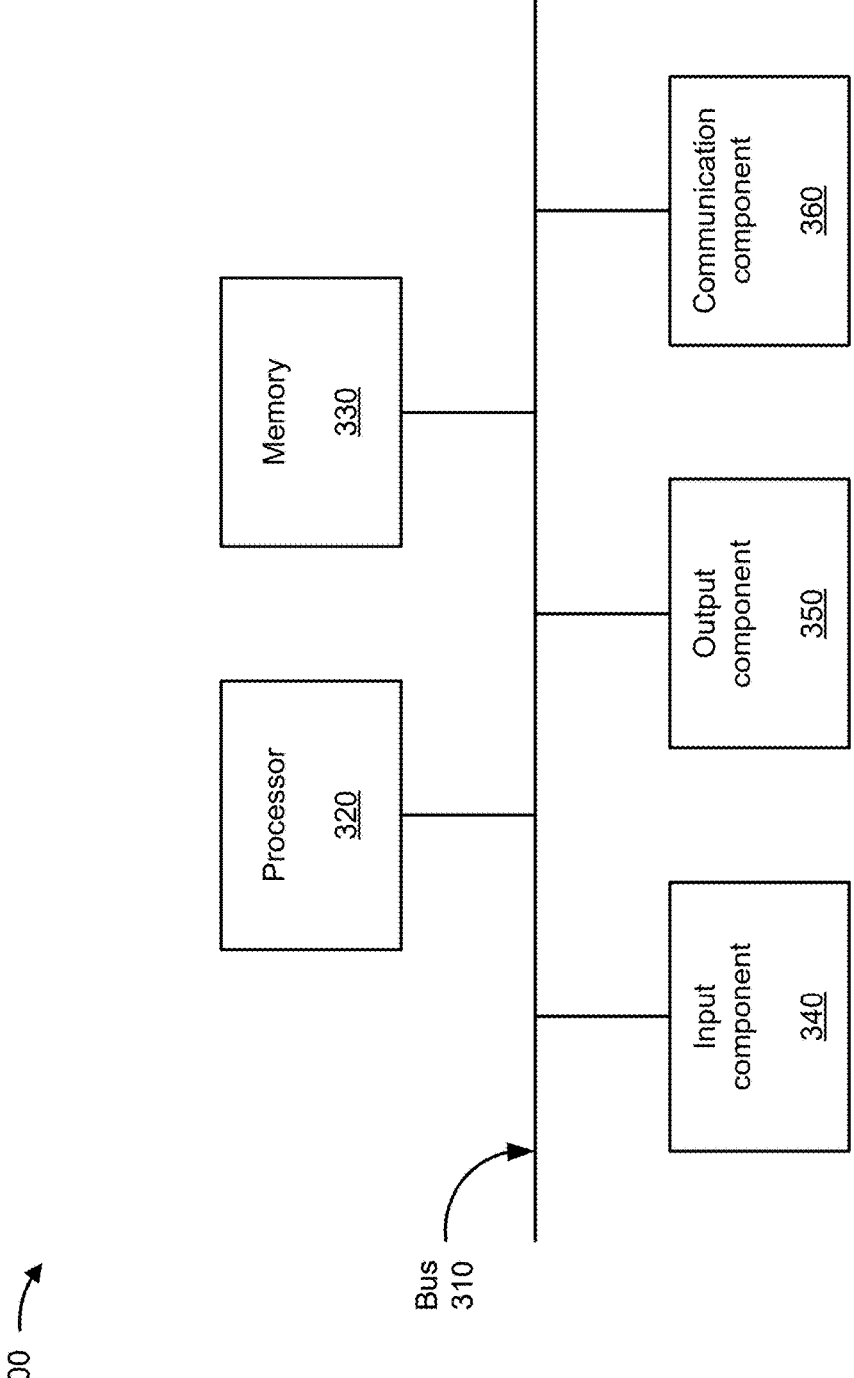
FIG. 3 is a diagram of example components of one or more devices of FIG. 2.

FIG. 3 is a diagram of example components of a device 300, which may correspond to the UE 105, the access point 110, the ePDG/N3IFW 115, the provisioning system 120, the NSSF 205, the NEF 210, the AUSF 215, the UDM 220, the PCF 225, the AF 230, the AMF 235, the SMF 240, and/or the UPF 245. In some implementations, the UE 105, the access point 110, the ePDG/N3IFW 115, the provisioning system 120, the NSSF 205, the NEF 210, the AUSF 215, the UDM 220, the PCF 225, the AF 230, the AMF 235, the SMF 240, and/or the UPF 245 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for providing priority for a UE associated with a non-3GPP access network. In some implementations, one or more process blocks of FIG. 4 may be performed by a network device (e.g., the ePDG/N3IFW 115). In some implementations, one or more process blocks of FIG. 4 may be performed by another device or a group of devices separate from or including the network device, such as a UE (e.g., the UE 105) and/or a provisioning system (e.g., the provisioning system 120). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a first private certificate associated with a first UE and a second private certificate associated with a second UE (block 410). For example, the network device may receive a first private certificate associated with a first UE and a second private certificate associated with a second UE, as described above. In some implementations, the network device communicates with the first UE and the second UE via a non-3GPP access network. In some implementations, the network device is one of an ePDG or an N3IWF. In some implementations, the network device receives the first private certificate and the second private certificate from a provisioning system.

As further shown in FIG. 4, process 400 may include provisioning the network device with the first private certificate and the second private certificate (block 420). For example, the network device may provision the network device with the first private certificate and the second private certificate, as described above.

As further shown in FIG. 4, process 400 may include receiving, from the first UE, an encrypted first request with a first payload that includes a priority indicator (block 430). For example, the network device may receive, from the first UE, an encrypted first IKE SA INIT request with a first payload that includes a priority indicator, as described above. In some implementations, the priority indicator is associated with a critical service provided to the first UE but not to the second UE. In some implementations, the critical service includes one of a mission critical service, a mission priority service, or an emergency service.

As further shown in FIG. 4, process 400 may include decrypting the encrypted first request with the first private certificate (block 440). For example, the network device may decrypt the encrypted first IKE SA INIT request with the first private certificate, as described above.

As further shown in FIG. 4, process 400 may include receiving, from the second UE, an encrypted second request with a second payload that does not include the priority indicator (block 450). For example, the network device may receive, from the second UE, an encrypted second IKE SA INIT request with a second payload that does not include the priority indicator, as described above.

As further shown in FIG. 4, process 400 may include decrypting the encrypted second request with the second private certificate (block 460). For example, the network device may decrypt the encrypted second IKE SA INIT request with the second private certificate, as described above.

As further shown in FIG. 4, process 400 may include detecting congestion associated with the network device (block 470). For example, the network device may detect congestion associated with the network device, as described above.

As further shown in FIG. 4, process 400 may include prioritizing traffic from the first UE over traffic from the second UE based on the congestion and based on the priority indicator (block 480). For example, the network device may prioritize traffic from the first UE over traffic from the second UE based on the congestion and based on the priority indicator being in the first IKE SA INIT request and not in the second IKE SA INIT request, as described above.

In some implementations, process 400 includes providing a first IKE SA INIT response with the priority indicator and first security options to the first UE, and providing a second IKE SA INIT response with second security options to the second UE. In some implementations, process 400 includes receiving a first priority of the first UE and a second priority of the second UE, and storing the first priority and the second priority in a data structure.

In some implementations, process 400 includes receiving, from the first UE, an encrypted third IKE SA INIT request, decrypting the encrypted third IKE SA INIT request with the first private certificate, receiving, from the second UE, an encrypted fourth IKE SA INIT request, decrypting the encrypted fourth IKE SA INIT request with the second private certificate, and prioritizing the traffic from the first UE over the traffic from the second UE based on the congestion and based on the first priority being higher than the second priority. In some implementations, process 400 includes providing a first IKE SA INIT response with first security options to the first UE, and providing a second IKE SA INIT response with second security options to the second UE.

In some implementations, process 400 includes receiving, from the first UE, an encrypted third IKE SA INIT request with a first flag set to a first priority, decrypting the encrypted third IKE SA INIT request with the first private certificate, receiving, from the second UE, an encrypted fourth IKE SA INIT request with a second flag set to a second priority, decrypting the encrypted fourth IKE SA INIT request with the second private certificate, and prioritizing the traffic from the first UE over the traffic from the second UE based on the first priority being higher than the second priority. In some implementations, process 400 includes providing, to the first UE, a first IKE SA INIT response with first security options and the first flag set to the first priority, and providing, to the second UE, a second IKE SA INIT response with second security options and the second flag set to the second priority. In some implementations, process 400 includes prioritizing the traffic from the first UE over traffic from one or more other UEs based on the congestion and based on the priority indicator.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device, a first private certificate associated with a first user equipment (UE) and a second private certificate associated with a second UE;
   provisioning, by the network device, the network device with the first private certificate and the second private certificate;
   receiving, by the network device and from the first UE, an encrypted first Internet key exchange (IKE) security association (SA) initialization (INIT) request with a first payload that includes a priority indicator;
   decrypting, by the network device, the encrypted first IKE SA INIT request with the first private certificate;
   receiving, by the network device and from the second UE, an encrypted second IKE SA INIT request with a second payload that does not include the priority indicator;
   decrypting, by the network device, the encrypted second IKE SA INIT request with the second private certificate;
   detecting, by the network device, congestion associated with the network device; and
   prioritizing, by the network device, traffic from the first UE over traffic from the second UE based on the congestion and based on the priority indicator being in the first IKE SA INIT request and not in the second IKE SA INIT request.

2. The method of claim 1, further comprising:
   providing a first IKE SA INIT response with the priority indicator and first security options to the first UE; and
   providing a second IKE SA INIT response with second security options to the second UE.

3. The method of claim 1, further comprising:
   receiving a first priority of the first UE and a second priority of the second UE; and
   storing the first priority and the second priority in a data structure.

4. The method of claim 3, further comprising:
   receiving, from the first UE, an encrypted third IKE SA INIT request;
   decrypting the encrypted third IKE SA INIT request with the first private certificate;
   receiving, from the second UE, an encrypted fourth IKE SA INIT request;
   decrypting the encrypted fourth IKE SA INIT request with the second private certificate; and
   prioritizing the traffic from the first UE over the traffic from the second UE based on the congestion and based on the first priority being higher than the second priority.

5. The method of claim 4, further comprising:
   providing a first IKE SA INIT response with first security options to the first UE; and
   providing a second IKE SA INIT response with second security options to the second UE.

6. The method of claim 1, further comprising:

receiving, from the first UE, an encrypted third IKE SA INIT request with a first flag set to a first priority;

decrypting the encrypted third IKE SA INIT request with the first private certificate;

receiving, from the second UE, an encrypted fourth IKE SA INIT request with a second flag set to a second priority;

decrypting the encrypted fourth IKE SA INIT request with the second private certificate; and prioritizing the traffic from the first UE over the traffic from the second UE based on the first priority being higher than the second priority.

7. The method of claim 6, further comprising:

providing, to the first UE, a first IKE SA INIT response with first security options and the first flag set to the first priority; and providing, to the second UE, a second IKE SA INIT response with second security options and the second flag set to the second priority.

8. A network device, comprising: memory; and one or more processors configured to:

receive a first private certificate associated with a first user equipment (UE) and a second private certificate associated with a second UE;

provision the network device with the first private certificate and the second private certificate;

receive, from the first UE, an encrypted first Internet key exchange (IKE) security association (SA) initialization (INIT) request with a first payload that includes a priority indicator;

decrypt the encrypted first IKE SA INIT request with the first private certificate;

receive, from the second UE, an encrypted second IKE SA INIT request with a second payload that does not include the priority indicator;

decrypt the encrypted second IKE SA INIT request with the second private certificate;

detect congestion associated with the network device;

prioritize traffic from the first UE over traffic from the second UE based on the congestion and based on the priority indicator being in the first IKE SA INIT request and not in the second IKE SA INIT request;

provide a first IKE SA INIT response with the priority indicator and first security options to the first UE; and provide a second IKE SA INIT response with second security options to the second UE.

9. The network device of claim 8, wherein the network device communicates with the first UE and the second UE via a non-Third-Generation-Partnership-Project access network.

10. The network device of claim 8, wherein the network device is one of an evolved packet data gateway or a non-Third-Generation-Partnership-Project interworking function.

11. The network device of claim 8, wherein the priority indicator is associated with a critical service provided to the first UE but not to the second UE.

12. The network device of claim 11, wherein the critical service includes one of a mission critical service, a mission priority service, or an emergency service.

13. The network device of claim 8, wherein the network device receives the first private certificate and the second private certificate from a provisioning system.

14. The network device of claim 8, wherein the one or more processors are further configured to:

prioritize the traffic from the first UE over traffic from one or more other UEs based on the congestion and based on the priority indicator.

15. A non-transitory computer-readable medium storing a set of instructions, the set of instructions comprising:

one or more instructions that, when executed by one or more processors of a network device, cause the network device to:

receive, from a provisioning system, a first private certificate associated with a first user equipment (UE) and a second private certificate associated with a second UE;

provision the network device with the first private certificate and the second private certificate;

receive, from the first UE, an encrypted first Internet key exchange (IKE) security association (SA) initialization (INIT) request with a first payload that includes a priority indicator;

decrypt the encrypted first IKE SA INIT request with the first private certificate;

receive, from the second UE, an encrypted second IKE SA INIT request with a second payload that does not include the priority indicator;

decrypt the encrypted second IKE SA INIT request with the second private certificate;

detect congestion associated with the network device; and prioritize traffic from the first UE over traffic from the second UE based on the congestion and based on the priority indicator being in the first IKE SA INIT request and not in the second IKE SA INIT request.

16. The non-transitory computer-readable medium of claim 15, wherein the one or more instructions further cause the network device to:

provide a first IKE SA INIT response with the priority indicator and first security options to the first UE; and provide a second IKE SA INIT response with second security options to the second UE.

17. The non-transitory computer-readable medium of claim 15, wherein the one or more instructions further cause the network device to:

receive a first priority of the first UE and a second priority of the second UE; and store the first priority and the second priority in a data structure.

18. The non-transitory computer-readable medium of claim 17, wherein the one or more instructions further cause the network device to:

receive, from the first UE, an encrypted third IKE SA INIT request;

decrypt the encrypted third IKE SA INIT request with the first private certificate;

receive, from the second UE, an encrypted fourth IKE SA INIT request;

decrypt the encrypted fourth IKE SA INIT request with the second private certificate; and prioritize the traffic from the first UE over the traffic from the second UE based on the congestion and based on the first priority being higher than the second priority.

19. The non-transitory computer-readable medium of claim 15, wherein the one or more instructions further cause the network device to:

receive, from the first UE, an encrypted third IKE SA INIT request with a first flag set to a first priority;

decrypt the encrypted third IKE SA INIT request with the first private certificate;

receive, from the second UE, an encrypted fourth IKE SA INIT request with a second flag set to a second priority;

decrypt the encrypted fourth IKE SA INIT request with the second private certificate; and prioritize the traffic from the first UE over the traffic from the second UE based on the first priority being higher than the second priority.

20. The non-transitory computer-readable medium of claim 19, wherein the one or more instructions further cause the network device to:

provide, to the first UE, a first IKE SA INIT response with first security options and the first flag set to the first priority; and provide, to the second UE, a second IKE SA INIT response with second security options and the second flag set to the second priority.

\* \* \* \* \*